United States Patent [19]

McKinzie et al.

[11] 4,128,704
[45] Dec. 5, 1978

[54] PHOTOELECTROCHEMICAL ENERGY STORAGE SYSTEM

[75] Inventors: Howard McKinzie, Framingham; Mark S. Wrighton, Medford; Joseph Lester, Acton, all of Mass.

[73] Assignee: GTE Laboratories Incorporated, Waltham, Mass.

[21] Appl. No.: 850,916

[22] Filed: Nov. 14, 1977

[51] Int. Cl.² ................. H01M 6/30; H01M 6/36
[52] U.S. Cl. .................................................. 429/111
[58] Field of Search ............................................. 429/111

[56] References Cited

U.S. PATENT DOCUMENTS

| | | | |
|---|---|---|---|
| 3,113,047 | 12/1963 | Lasser et al. | 429/111 X |
| 4,021,323 | 5/1977 | Kilby et al. | 204/129 |
| 4,064,326 | 12/1977 | Manassen et al. | 429/111 |

OTHER PUBLICATIONS

J. Manassen et al., "Photoelectrochemical Energy Conversion & Storage" J. Electrochemical Soc., vol. 124, pp. 532-534 (1977).
J. Manassen et al. "Electrochemical, Solid State, Photochemical and Technological Aspects of Photoelectrochemical Energy Converters" Nature, vol. 263, pp. 97-100 (1976).
M. Eisenberg et al. "Photo-Electrochemical Cells", Electrochimica Acta, vol. 5, pp. 1-12 (1961).

*Primary Examiner*—John H. Mack
*Assistant Examiner*—Aaron Weisstuch
*Attorney, Agent, or Firm*—David M. Keay

[57] ABSTRACT

A photochemical energy storage system includes at least one electrolytic solution containing a reduction-oxidation couple, one species of which can be stored in a second phase. The device includes a charging system and an energy delivery system. The charging system includes an n-or p-type photosensitive electrode at which, under illumination, an oxidation or reduction reaction occurs. In the charging cycle, one species is oxidized while the other is reduced, and one of these products is stored in a phase other than the phase in which the reaction occurs. The energy delivery system transfers electrons to or from the high energy product on demand for delivery through an electrical load to an electrode at which the original reactants can be reconstituted.

18 Claims, 3 Drawing Figures

PHOTOELECTROCHEMICAL ENERGY STORAGE SYSTEM

BACKGROUND OF THE INVENTION

The present invention relates to energy storage systems and more particularly to a photochemical energy storage system capable of both converting optical energy to a highly stable form for storage and of drawing from the stored energy form upon demand.

It has been discovered that water can be photodissociated into hydrogen and oxygen at very low voltage potentials by using titanium dioxide electrodes and a light source which produces substantial amounts of radiation in the ultraviolet region of the spectrum. This discovery has opened a new area of research into the conversion of solar energy into hydrogen, which is a more usable and storable form of energy. The hydrogen generated by the photodissociation process can be stored for subsequent use either as a high pressure gas or as a metal hydride. However, the need to store and transport hydrogen gives rise to well-known hazards.

For this reason, efforts have been made to discover photochemical reactions which result in a stable, high energy storage product. The problem with known photochemical reactions is that the reverse reaction occurs rapidly when the application of input energy (for example, solar energy) is interrupted. During the reverse reaction, the stored energy is rapidly lost in the form of heat.

The problem is how to store the energy in a safe, stable form for later delivery at a controlled rate.

SUMMARY OF THE INVENTION

The present invention is a photochemical energy storage system which solves the problem of safe, stable energy storage by converting a low energy chemical species to a high energy form which is segregated into a different phase until needed.

The photochemical energy storage system employs an electrolyte containing the constituents of a reduction-oxidation (redox) couple. The source has a charging system which includes a photoactive electrode immersed in the electrolyte. The photoactive electrode responds to the incident optical energy to drive a particular redox reaction away from thermodynamic equilibrium. An interruptable current conductor is connected in series between the photoactive electrode and a second electrode also immersed in the electrolyte. Electrons flowing between the two electrodes trigger the complementary redox reaction at the second electrode. The product resulting from the redox reaction at one of the electrodes is stored in a phase which differs from the phase of the same constituent prior to the reaction. The source also includes an energy delivery system including an electrode which is in contact with the stored product. An interruptable current conductor is connected in series between this electrode and another electrode immersed in the electrolyte. When the circuit is complete between the two electrodes, an electron flow is established to allow reactions which are the reverse of those occurring during operation of the charging system. The stored energy is obtained as electrical energy.

DESCRIPTION OF THE DRAWINGS

While the specification concludes with claims particularly pointing out and distinctly claiming that which is regarded as the present invention, details of preferred embodiments of the invention may be more readily ascertained from the following detailed description when read in conjunction with the accompanying drawings wherein:

DETAILED DESCRIPTION

Figure 1:
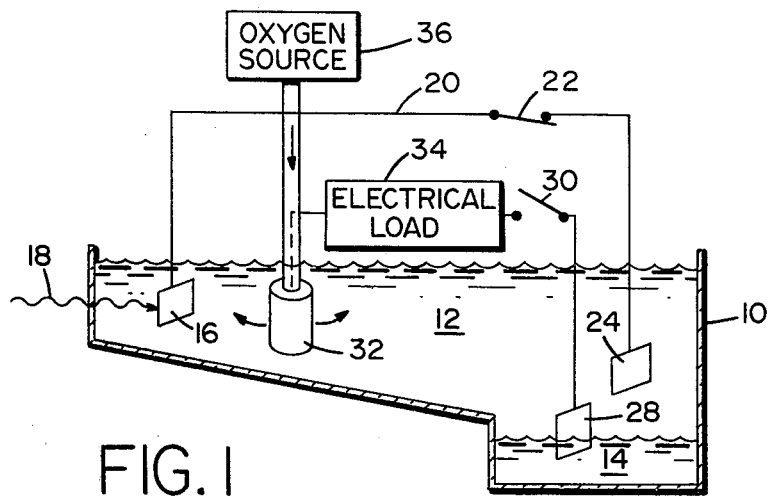
FIG. 1 is a schematic representation of an energy storage system incorporating the present invention.

Referring to FIG. 1, one embodiment of a photochemical energy storage system constructed in accordance with the present invention includes a fluid-tight container 10 for a solution 12 which contains at least one electrolyte. An energy source constructed in accordance with the present invention includes two distinct systems. One system is a charging system which uses optical energy to produce a stable high energy chemical species from which energy can be extracted. The second system is a discharge or delivery system which extracts that energy upon demand, making it available in electrical form.

The charging system includes a photoactive electrode 16 immersed in solution 12. Electrode 16 is exposed to a source of optical energy, indicated by serpentine arrow 18, such as the sun or any artificial light source which can provide significant amounts of optical energy in the region most effective for the particular system materials. When the charging system is active, electrode 16 is short-circuited through a connection 20 and a switch 22 to a second electrode 24 immersed in the solution 12 at some distance from electrode 16.

Electrode 16 contains a material which, when subjected to light, is capable of supporting a particular redox reaction in the vicinity of the electrode. If the particular redox reaction is an oxidation reaction, liberated electrons leave the solution 12 through electrode 16. These electrons flow through connection 20 and switch 22 to the second electrode 24 which may, in one embodiment, be made of an inert material such as platinum. These electrons re-enter the solution at electrode 24 to support a reduction reaction.

In accordance with this invention, the component which is formed as a result of the reduction reaction is segregated into a different phase than the original phase of the reactants. The reduction product is stored in this different phase. In one embodiment of the invention, to be described in more detail later, elemental mercury is produced as a result of a reduction reaction and can be stored in sump 14. The type of storage which is provided is a function of the reduced component. Most metals will not precipitate from solution but will, instead, adhere to electrode 24. Gaseous products may also be produced by the reduction reaction and stored in an air-tight tank. Thus, the energy which originally entered the system as optical energy can be stored in a phase different from the phase of the system reactants. A highly stable and relatively hazard-free energy storage system can be achieved.

The energy system also includes a discharge or energy delivery system which reverses the charging reaction. The energy delivery system includes an electrode 28 which is either in constant contact with or can be brought into contact with the stored product. When a switch 30 in the discharge circuit is closed, electrons are transferred to or from the stored product in an oxidation or reduction reaction and are conducted to another electrode 32 through a series electrical load 34. Of course, when the electrons are transferred, the stored product is oxidized or reduced to its original phase and form and re-enters the solution 12. A reaction is established at electrode 32 to complete the reverse reaction.

In one embodiment of the invention, solution 12 is an aqueous solution including an ionizable metal salt and an acid having a common anionic moiety. Specific examples of metal salts and acids considered to be suitable are set forth below. Electrode 16 contains a material, such as titanium dioxide, or strontium titanate, which when subjected to light in the ultraviolet region is capable of photodissociating water in the vicinity of the electrode. When photodissociation occurs, oxygen evolves from solution 12 as hydrogen ions are produced. The electrons which are liberated at electrode 16 are conducted to electrode 24. Electrons re-entering the solution of electrode 24 combine with the positive metal ions in a reduction reaction which produces elemental metal. If the electrolyte contains a mercury compound, elemental mercury is precipitated from the solution and may be collected in a sump 14. Other metals, such as copper, will not necessarily precipitate from solution but instead may adhere to the electrode 24 as a coating. Thus, in this embodiment, energy which originally enters the system as optical energy is stored in the form of elemental metal.

When the energy delivery system in this embodiment of this invention is active, electrons are abstracted from the elemental metal at electrode 28. The metal ion re-forms and re-enters the solution.

Oxygen or an oxygen-containing gas, such as air, from a source 36 is bubbled through electrode 32, which, in a preferred embodiment, is a platinum-coated porous ceramic material. Other porous supports such as graphite or porous carbon can be used as a support material for electrode 32. The electrons which are conducted to electrode 32 re-enter the solution to de-ionize available hydrogen ions, thereby producing hydrogen atoms which can be combined with oxygen provided by source 36 to reconstitute water.

The photochemical reactions which occur in this embodiment are illustrated with reference to specific metal salts and acids in solution 12. In one embodiment, the metal salt is mercuric perchlorate or Hg (ClO$_4$)$_2$ and the acid is perchloric acid or HClO$_4$. The photodissociation reaction which occurs at electrode 16 in the presence of ultraviolet light ($h\gamma$) can be written as

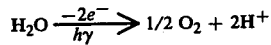

while the reduction reaction which takes place at electrode 24 can be written as: Hg$^{2+}$ + 2e$^-$→Hg$^\circ$ The overall net reaction in the charging system for this embodiment of the device therefore is

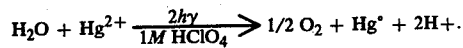

Other anions would be suitable.

The reverse reaction occurs during the discharge process to provide the electrical energy for driving electrical load 34.

In another embodiment, cupric sulfate (CuSO$_4$) serves as the dissolved metal salt in a solution including sulfuric acid, H$_2$SO$_4$. The photodissociation reaction occurring at electrode 16 remains the same. At electrode 24, the reaction which occurs can be written as Cu$^{2+}$ + 2e$^-$→Cu$^\circ$.

The charging capabilities of a cell using Cu⇌Cu$^{2+}$ + 2e$^-$ as the working couple were tested by shorting a TiO$_2$ electrode to a platinum counter electrode in a 0.5 molar cupric sulfate electrolyte. When light from a high pressure xenon lamp was focused on the TiO$_2$ electrode, oxygen evolved from the electrode and copper was reduced on both electrodes.

The discharge capabilities of a cell using this working couple were tested by immersing a copper electrode in a 0.5 molar sulfuric acid electrolyte. The copper electrode was connected through an ammeter to a platinized platinum electrode through which oxygen was bubbled. Currents as high as 100 ma were observed with an open circuit potential of 0.62 volts. The solution began to turn blue in a short time, indicating the dissolution of copper; i.e., Cu$^\circ$ → Cu$^{2+}$ + 2e$^-$.

Figure 3:
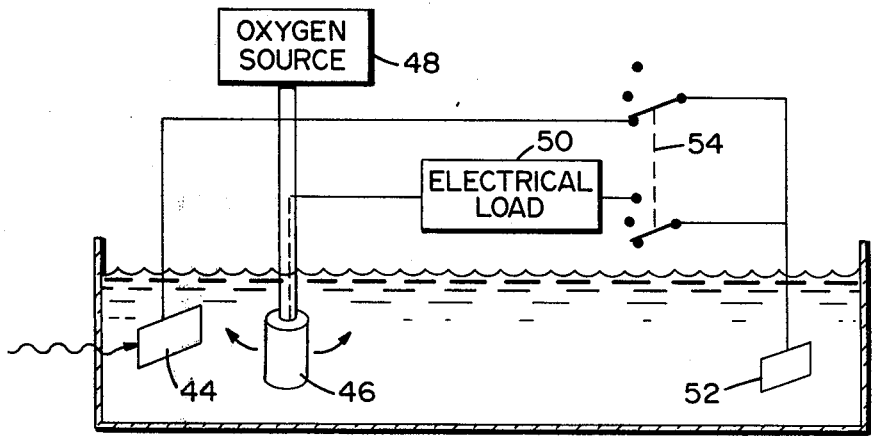
FIG. 3 is a schematic representation of still another embodiment of a photochemical energy storage system.

FIG. 3 discloses a three electrode apparatus suitable for a copper-based system. This system is similar to previously described systems in that it includes a photoactive electrode 44 subject to optical energy, a reducing electrode 46 to which oxygen from a source 48 may be applied, and an electrical load 50 in circuit with the reducing electrode 46.

Unlike the previously described system, this system has a single electrode 52 which serves as an energy storage electrode during charging and as an energy source during discharging. Electrode 52, upon which elemental copper is deposited during charging, can be connected, alternatively, to electrode 44, to electrical load 50 or to neither through a ganged three-position switch assembly 54.

To test the system using the mercury working couple, an n-type TiO$_2$ electrode was shorted to a platinum anode. The electrolyte contained a mercury II salt, such as mercuric nitrate or mercuric perchlorate. When the electrode was exposed to radiation in the ultraviolet region, oxygen was evolved at the TiO$_2$ electrode and mercury droplets were observed at both electrodes.

The discharge capabilities of a cell using a mercury working couple were tested by placing a pool of mercury in a nitric acid or perchloric acid electrolyte both with and without the corresponding sodium salt. The mercury functions both as the stored energy source and as an electrode. When the mercury was connected to the platinized counter electrode and oxygen was bubbled into the system, currents of 30ma were obtained. By heating the system to in excess of 90° C., currents of up to 900ma were obtained with the open circuit potential varying from 0.2 to 0.4 volts.

In a third type of system, copper was again used as the working couple while elemental mercury served as the counter electrode. In this system, the copper which is reduced from solution forms an amalgam with the mercury electrode.

Figure 2:
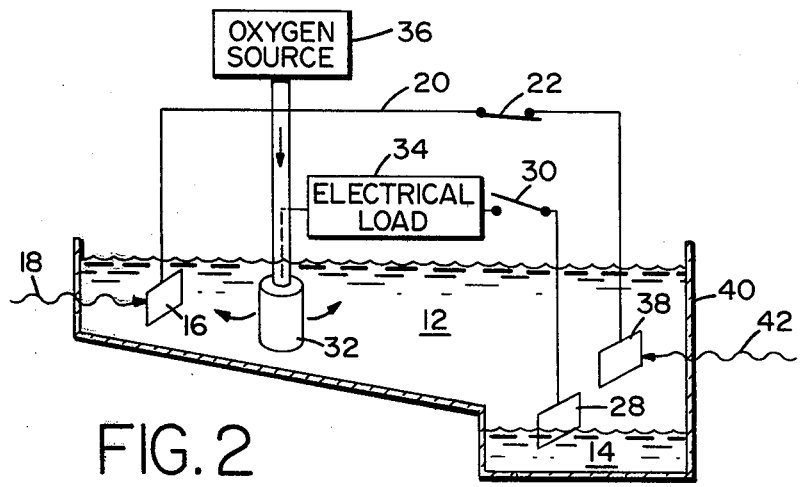
FIG. 2 is a schematic representation of an alternative embodiment of a photochemical energy storage system.

The efficiency of the system shown in FIG. 1 can be enhanced for either a mercury or a copper working couple by using a p-type semiconductor as the counter electrode in the charging system. This is shown in FIG. 2 wherein unchanged elements are represented by the same numerals applied in FIG. 1. In this alternative embodiment of the invention, the counter electrode 38 would be a p-type semiconductor such as gallium arsenide which is photoresponsive. The container 40 for this embodiment of the invention would have to permit optical energy, designated by serpentine arrow 42, to impinge upon the counter electrode 38. The cathodic, anodic and net reactions would remain the same; however, more of the solar spectrum could be utilized to increase the efficiency of the overall process.

While specific examples for metal salts and acids and for the electrode materials have been given, the invention should not be deemed to be limited to the particular examples. The critical requirements for the chemical reaction are as follows: The oxidation and reduction levels must lie within the band gap of the semiconducting electrodes for efficient electron transfer. The reaction must be reversible. The high energy products should be easily storable in a relatively stable, second phase. The open circuit potential should be as high as possible as should the short circuit current, to maximize power. Finally, the semiconducting photoelectrodes must be stable with respect to the electrolyte and chemical reactants, and vice versa. A number of suitable redox couples can be found in Oxidation Potentials, W. M. Latimer, 2nd edition (1952) published by Prentice Hall, and in other reference sources.

The specific examples provided above call for the use of aqueous electrolytes. The use of non-aqueous electrolytes and oxidants other than air is considered to be within the scope of this invention. There are, in fact, several advantages to using such electrolytes and oxidants. The output potential in aqueous solutions is limited to 1.23 volts by the dissociation energy of water. Some non-aqueous electrolytes, such as acetonitrile, have a working potential range of 5.0 volts or greater, which permits the use of redox couples with much larger potentials than those suitable for aqueous electrolytes. By choosing oxidants with larger potentials, the potential available from the cell can be selected to be more nearly equal to the band gap of the semi-conducting electrode. This serves to increase the efficiency of the energy conversion and storage processes.

Where a non-aqueous electrolyte is used, it is also possible to use electrodes which would normally decompose in aqueous solutions. Such electrodes may have lower band gaps than the electrodes suitable for use in aqueous solutions. The potential of the redox couple in the non-aqueous electrolyte would be matched to the band gap of the semi-conducting electrode to increase the efficiency of the process by utilizing more of the solar spectrum. Finally, it may be possible to use reversible electrodes for some of the high potential oxidants, such as the halogens. The use of reversible electrodes would eliminate losses due to overpotential, which losses can easily occur in systems using oxygen as an oxidant and compatible electrodes.

One example of a system having a non-aqueous electrolyte and a non-oxygen oxidant would employ a molten salt electrolyte maintained above its melting point. A specific example of such an electrolyte is ethyl pyridinium bromide which also provides the redox couple. A photoactive electrode immersed in this electrolyte, such as a titanium dioxide-coated electrode, upon irradiation, forms bromine and the ethyl pyridinyl radical. The bromine rapidly evolves in gaseous form and can be collected and stored in a cooled chamber as a liquid. The ethyl pyridinyl radicals remain in the molten salt and may dimerize. When energy is to be delivered in electrical form, the bromine storage chamber may be warmed slightly to increase the bromine vapor pressure. These vapors are passed over a platinum or platinum-containing electrode in the molten salt to reform the ethyl pyridinium bromide and to release the stored energy.

While preferred embodiments of the invention have been described in detail, variations and modifications of those embodiments will occur to those skilled in the art once they become familiar with the basic concepts of the invention.

Therefore, it is intended that the appended claims shall be construed to include all such variations and modifications as fall within the true spirit and scope of the invention.

What is claimed is:

1. A photochemical energy storage system for storing energy and for delivering that energy in electrical form upon demand comprising:
    (a) a fluid-tight container;
    (b) an electrolyte within said container comprising at least one ionizable compound having cationic and anionic portions;
    (c) a charging system comprising a photoactive first electrode immersed in said electrolyte and responsive to applied optical energy to oxidize the ionizable compound or a portion thereof to liberate electrons, a first interruptible electron conductor connected in series with said first electrode, a second electrode immersed in said electrolyte and connected to said first interruptible electron conductor for receiving the electrons to reduce the ionizable compound or a portion thereof, and storage means provided in said container for storing the product of the reduction reaction in a phase which differs from the phase of the ionizable compound; and
    (d) an energy delivery system having a third electrode in said container for contacting the stored product to abstract electrons therefrom in an oxidation reaction, a second interruptible electron conductor connected in series with said third electrode, and a fourth electrode immersed in said electrolyte connected to said second interruptible electron conductor for transferring the electrons to establish a redox reaction by which said cationic and anionic portions are recombined.

2. A photochemical energy storage system as recited in claim 1 wherein the electrolyte is non-aqueous.

3. A photochemical energy storage system as recited in claim 2 wherein the electrolyte is a molten salt compound maintained above its melting point.

4. A photochemical energy storage system as recited in claim 3 wherein the electrolyte is ethyl pyridinium bromide.

5. A photochemical energy storage system for storing energy and for delivering electrical energy comprising:
    (a) an aqueous solution including an ionizable metal salt and an acid having a common anionic moiety;
    (b) a charging system including a photosensitive electrode immersed in said solution and responsive to optical energy to photodissociate water into hydrogen ions and oxygen, a second electrode immersed in the solution, interruptible means for conducting electrons resulting from the photodissociation process from the first electrode to the second electrode, and means for collecting elemental metal produced by reduction of said ionizable metal salt from said solution at the second electrode;

(c) an energy delivery system comprising a third electrode in contact with the elemental metal, a fourth electrode immersed in the aqueous solution and capable of reconstituting water from hydrogen ions and oxygen, and interruptible means for conducting electrons from said third electrode to said fourth electrode.

6. A photochemical energy storage system as recited in claim 5 wherein the aqueous solution includes a chlorine-containing acid and a chlorine-containing compound of mercury.

7. A photochemical energy storage system as recited in claim 6 wherein said second electrode comprises platinum.

8. A photochemical energy storage system as recited in claim 6 wherein said second electrode comprises a p-type semiconductor material.

9. A photochemical energy storage system as recited in claim 5 wherein the aqueous solution includes a sulfur containing acid and a sulfur-containing compound of copper.

10. A photochemical energy storage system as recited in claim 9 wherein said second electrode includes comprises platinum.

11. A photochemical energy storage system as recited in claim 9 wherein said second electrode comprises a p-type semiconductor material.

12. A photochemical energy storage system as recited in claim 5 wherein said energy delivery system further includes means for applying oxygen or an oxygen-containing gas to the fourth electrode.

13. A photochemical energy storage system as recited in claim 12 wherein said fourth electrode comprises a porous support member having a coating of a catalyst material for enhancing the recombination of hydrogen ions and oxygen into water.

14. A photochemical energy storage system as recited in claim 13 wherein the catalyst comprises platinum.

15. A photochemical energy storage system as recited in claim 14 wherein the support member is a porous ceramic material.

16. A photochemical energy storage system as recited in claim 5 wherein the photosensitive electrode comprises an n-type semiconductor material.

17. A photochemical energy storage system as recited in claim 16 wherein the semiconductor material is an oxide compound containing titanium.

18. A photorechargeable battery comprising:
(a) an aqueous electrolytic solution containing an acid and an ionizable metal salt having a common anionic moiety;
(b) charging means responsive to impinging optical energy for producing elemental metal by reduction of said ionizable metal salt from said solution; and
(c) energy delivery means for abstracting electrons from the elemental metal and for applying the electrons through an electrical load to an electrode to complete the reverse of the charging reaction.

* * * * *